United States Patent
Yamada

(10) Patent No.: US 6,825,757 B2
(45) Date of Patent: Nov. 30, 2004

(54) VEHICLE PERIMETER MONITOR

(75) Inventor: Yuusuke Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/844,280

(22) Filed: Apr. 30, 2001

(65) Prior Publication Data
US 2002/0039064 A1 Apr. 4, 2002

(30) Foreign Application Priority Data
Oct. 4, 2000 (JP) ........................................ 2000-304953

(51) Int. Cl.$^7$ ................................................ B60Q 1/00
(52) U.S. Cl. ..................... 340/436; 340/539.1; 340/903; 359/843
(58) Field of Search ................................. 340/436, 435, 340/539, 903, 425.5; 359/843; 342/70, 158

(56) References Cited

U.S. PATENT DOCUMENTS

| | | | | |
|---|---|---|---|---|
| 4,694,295 A | * | 9/1987 | Miller et al. | 340/903 |
| 5,008,678 A | * | 4/1991 | Herman | 342/158 |
| 5,076,384 A | * | 12/1991 | Wada et al. | 180/169 |
| 5,313,335 A | * | 5/1994 | Gray et al. | 359/839 |
| 5,929,786 A | * | 7/1999 | Schofield et al. | 340/903 |
| 5,999,092 A | * | 12/1999 | Smith et al. | 340/436 |
| 6,193,380 B1 | * | 2/2001 | Jacobs | 359/843 |
| 6,198,409 B1 | * | 3/2001 | Schofield et al. | 340/903 |
| 6,243,024 B1 | * | 6/2001 | Yamabuchi et al. | 340/903 |
| 6,452,533 B1 | * | 9/2002 | Yamabuchi et al. | 342/70 |

* cited by examiner

Primary Examiner—Daniel J. Wu
Assistant Examiner—Phung Nguyen
(74) Attorney, Agent, or Firm—Sughrue Mion, PLLC

(57) ABSTRACT

A vehicle perimeter monitor having a high range-finding performance of a short distance and capable of presenting correct information to a driver is provided. A radar 1 including a transmitting antenna 2 and a receiving antenna 3 is fixed on a support member 8 which is a support member integral with a door mirror 7. Accordingly, even if the driver changed viewing direction of the door mirror 7, the positions the transmitting antenna 2 and the receiving antenna 3 relative to the door mirror 7 are kept constant. Therefore, though a part of the radiated transmit wave may be reflected by the door mirror 7, by measuring the reflected wave by the door mirror 7 beforehand, the reflected wave can be canceled by a signal processing circuit part 5.

11 Claims, 3 Drawing Sheets

VEHICLE PERIMETER MONITOR

BACKGROUND OF THE INVENTION

1. Field of the Invention

The present invention relates to a vehicle perimeter monitor carried by a vehicle for watching vehicle perimeter and more particularly to a vehicle perimeter monitor which calls attention to the driver in order to avoid contact or collision with obstacles such as other vehicles during traffic lane change.

2. Background Art

As a conventional vehicle perimeter monitor, for example, Japanese Patent Laid-Open No. 325688/1999 discloses a vehicle perimeter monitor which comprises a transmitting circuit for generating transmit wave, an antenna carried around or interior of a door mirror apparatus of a vehicle for radiating transmit wave by way of the door mirror and a receive circuit which receives reflected wave from back by obstacles existing in the perimeter of vehicle with the aid of a receiving antenna by way of mirror surface of the door mirror apparatus. Furthermore, this conventional example is characterized in that on the mirror surface of the door mirror apparatus is deposited reflective coating which allows electromagnetic waves of several GHz–100 GHz to pass through though reflecting back waves having a wavelength of visible light.

In such a conventional monitor, the reflective coating which allows electromagnetic wave to pass through is deposited on the door mirror but there also exists reflections in some degree by the surface of mirror base material and the reflective coating. Furthermore, in case that the antenna is carried interior of the door mirror, the positional relationship between the door mirror and the antenna fluctuates every time when the viewing direction of the door mirror attached to the outer casing of the door mirror apparatus is adjusted by an actuator resulting in that the reflection of transmit wave caused by the door mirror is not maintained constant. Consequently, the condition seems as if an obstacle always exists within a very short distance and so in case that an obstacle exists within a very short distance in reality, there arises a problem that the obstacle can not be detected depending on the range resolution of the radar or that the possibility of false alarm is enhanced because of the deterioration of the range-finding performance of a short distance.

SUMMARY OF THE INVENTION

The present invention has been made to resolve such problems as described above and an object of the present invention is to provide a vehicle perimeter monitor having a superior range-finding performance of a short distance and capable of providing a correct information to a driver.

The vehicle perimeter monitor according to the invention is one carried by a vehicle having a door mirror consisting of the material which allows radio wave to pass sufficiently, a support member for supporting the door mirror and an actuator for moving the door mirror with the support member integrally to change viewing direction, the monitor comprising a transmitting antenna fixed on the support member for radiating transmit wave generated by a transmitting circuit to the perimeter of the vehicle through the door mirror, a receiving antenna fixed on the support member for receiving the reflected wave reflected obstacles existing in the perimeter of the vehicle through the door mirror to send a receiving information to a receiving circuit, a processing unit for calculating the distance between the vehicle and the obstacles based on the receiving information and determining danger degree of collision and a indicator for notifying the result of calculating by said processing unit to the driver of the vehicle.

According to the vehicle perimeter monitor of the invention, because the transmitting antenna and the receiving antenna are fixed to the support member for supporting the door mirror, the positions of the transmitting antenna relative to and the receiving antenna or the door mirror are always kept constant even if the driver changed the viewing direction of the door mirror. Therefore, as the reflection of transmit wave from the transmitting antenna is measured beforehand to be canceled, the range-finding performance of a short distance is improved and it is made possible to get rid of false alarms.

In addition, the transmitting antenna is installed at such a distance from the door mirror that the reflection of the transmit wave by the door mirror becomes smallest.

By setting the reflection of transmit wave by the door mirror smallest, the influence of reflection caused by the door mirror is restrained and so the range-finding performance of a short distance is improved furthermore.

Additionally, the transmitting antenna has a radiation pattern shaped to cover a wide area so as to be capable of covering required detection area even in the case that the driver changed the viewing direction.

By setting the reflection of transmit wave by the door mirror smallest, the influence of reflection caused by the door mirror is restrained and so the range-finding performance of a short distance is improved furthermore.

Furthermore, the transmitting antenna and the receiving antenna is attached to support members respectively by means of holder members having different shapes to each other at left and right door mirror apparatus.

By attaching the transmitting antenna and the receiving antenna to left and right door mirror respectively by use of holder members having different shape to each other, the transmitting antenna and the receiving antenna can be deployed interior of the door mirror even in the case that the viewing direction of the driver and the door mirror differs between left and right door mirror apparatus.

BRIEF DESCRIPTION OF THE DRAWINGS

With references to the accompanying drawing.

DETAILED DESCRIPTION OF THE INVENTION

First Embodiment

Figure 1:
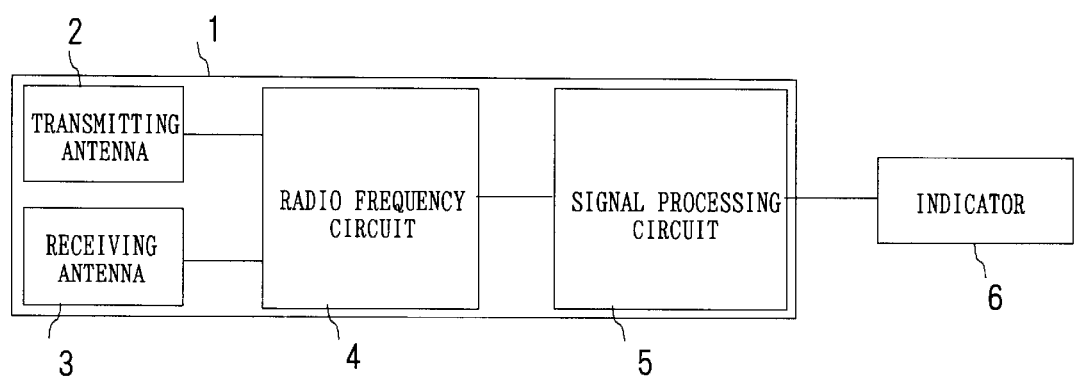
FIG. 1 is a block diagram showing the architecture of the vehicle perimeter monitor of the first embodiment according to the present invention.

Referring to the accompanying drawings, a description is made of embodiments according to the invention hereinafter. FIG. 1 is a block diagram showing the architecture of the vehicle perimeter monitor which is the first embodiment of the invention. In FIG. 1, reference numeral 1 designates a radar of the vehicle perimeter monitor of this embodiment which comprises a transmitting antenna 2 for radiating transmit wave generated by a transmitting circuit through a door mirror to the perimeter of the vehicle, a receiving antenna 3 for receiving the reflected wave from the obstacles existing in the perimeter of vehicle through the door mirror to send a receiving information to a receiving circuit, a radio-frequency circuit 4 including the transmitting circuit and the receiving circuit, and a signal processing circuit 5 as a calculating means for calculating the distance between the vehicle and the obstacle based on the information inputted to the receiving circuit to determine the danger degree of collision. In addition, reference numeral 6 designates an indicator composing a display part for alarming the effect determined by a signal processing circuit 5 to the driver, which is installed interior of the automobile or around the door mirror.

Figure 2:
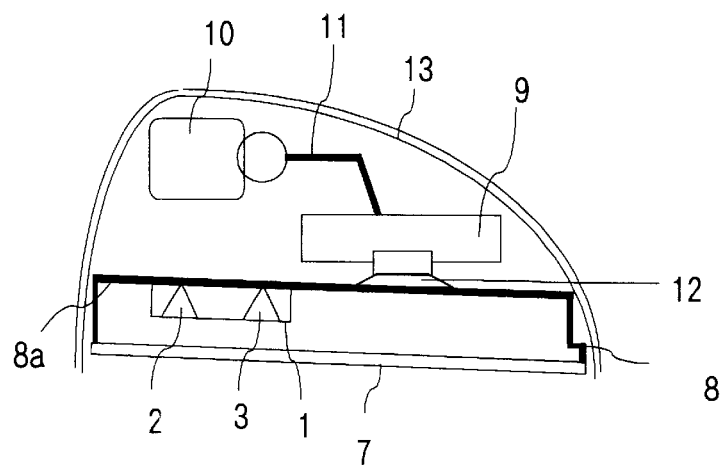
FIG. 2 is a cross-sectional view showing the internal structure of the door mirror in which a radar of the vehicle perimeter monitor of the first embodiment according to the invention is installed.

In addition, FIG. 2 is a cross-sectional view showing the internal structure of the door mirror apparatus in which the radar 1 of vehicle perimeter monitor in this embodiment is installed. In the drawing, reference numeral 7 designates a door mirror consisting of a material which allows radio wave to pass through sufficiently. Reference numeral 8 designates a support member which is integral with the door mirror 7 and supports the door mirror 7 within the door mirror apparatus. Reference numeral 9 designates an actuator unit which moves the door mirror 7 with the support member 8 integrally to change viewing direction. Reference numeral 10 designates a motor to drive the actuator 9. Reference numeral 11 designates a wire harness for the motor 10. Reference numeral 12 designates a coupling part for coupling the support member 8 to the actuator 9. Reference numeral 13 designates a housing member of the door mirror apparatus. The transmitting antenna 2 and the receiving antenna 3 of the radar 1 shown in FIG. 1 are fixed on the surface 8a of the support member 8 opposing to the door mirror 7

The vehicle perimeter monitor of the present embodiment is one carried by a vehicle which comprises the door mirror 7 consisting of the material which allows radio wave to pass sufficiently and the support member 8 integral with the door mirror 7 supporting the door mirror 7 interior of the door mirror apparatus, and characterized in that the radar 1 including the transmitting antenna 2 and the receiving antenna 3 is fixed to the support member 8.

A description is made of action. Radio wave generated by the transmitting circuit of the radio-frequency circuit 4 is radiated through the door mirror 7 to the perimeter of the vehicle from the transmitting antenna 2. In case that there is an obstacle such as other vehicles in the perimeter of the vehicle, reflected wave from the obstacle is received by the receiving antenna 3 by through the door mirror 7 and the receiving information of the receiving antenna 3 inputted into the receiving circuit of the radio-frequency circuit 4. The reflected wave inputted to the radio-frequency circuit 4, namely the receiving information is down-converted into low frequency and inputted to the signal processing circuit 5. The signal processing circuit 5 calculates the distance to the obstacle and determines the danger degree of collision. If it is determined that there is a danger of collision, the effect is alarmed to the driver on the indicator 6 to call attentions.

In the present embodiment, since the radar 1 including the transmitting antenna 2 and the receiving antenna 3 is fixed to the support member 8 integral the with the door mirror 7, relative positional relationship between the transmitting antenna 2 and the receiving antenna 3 or the door mirror 7 does not change and the distance always remains the same as before, even if the driver changed viewing direction of the door mirror 7. In other words, a part of the transmit wave radiated from the transmitting antenna 2 is reflected back by the door mirror 7 and so making the reflected wave from the door mirror 7 being measured in the relative positional relationship beforehand, the reflected wave from the door mirror 7 can be canceled by the signal processing circuit 5. This reflected wave is always fixed and no effects are caused even when the driver changed viewing direction of the door mirror 7. Therefore, there remains no anxiety that the transmit wave reflected by the door mirror 7 is mistaken for a reflected wave reflected by an obstacle existing in the perimeter of the automobile within a very short distance. As for the radar, since the range resolution (capability of resolving two obstacles) is determined by band width, there has been a problem that the range-finding performance of a short distance is deteriorated in case of detecting a reflected wave reflected back from extremely short distance. However, according to the present embodiment, canceling the reflected wave reflected by the door mirror 7 by measuring it beforehand, the range-finding performance of the short distance is improved and it is made possible to get rid of false alarms.

Second Embodiment

Figure 3:
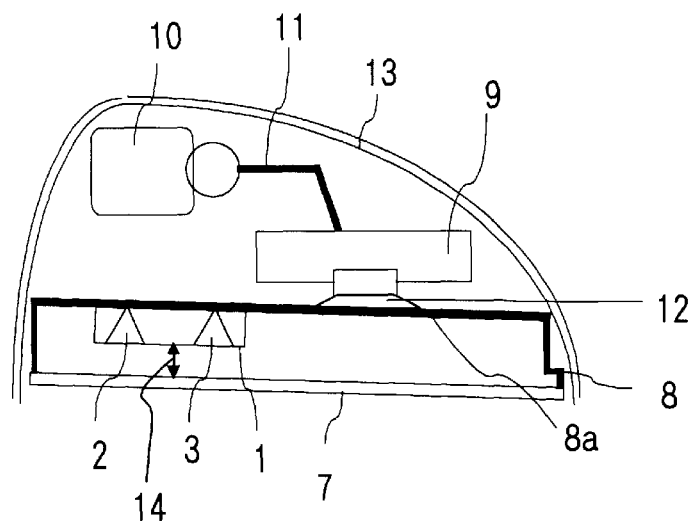
FIG. 3 is a cross-sectional view showing the internal structure of the door mirror in which the radar of the vehicle perimeter monitor of the second embodiment according to the invention is installed.

FIG. 3 is a cross-sectional view showing the internal structure of the door mirror in which the radar of the vehicle perimeter monitor in the second embodiment of the present invention is installed. In the figure, reference numeral 14 designates a distance between the radar 1 and the door mirror 7. Incidentally, in FIG. 3, reference numerals designating equal parts or corresponding parts are the same as those in FIG. 1 and so their explanation is omitted.

In the vehicle perimeter monitor of the present embodiment, by fixing the radar 1 on the support member 8 integral with the door mirror 7 like the first embodiment, relative positional relationship between the transmitting antenna 2 and the receiving antenna 3 or the door mirror 7 is always kept constant and the reflection of transmit wave by the door mirror 7 is measured beforehand to be canceled. Furthermore, the distance 14 between the transmitting antenna 2, namely the radar 1 and the door mirror 7 is set so as to minimize the reflection by the door mirror 7 of transmit wave radiated from the transmitting antenna 2.

Thus, transmit wave is radiated toward the space with hardly reflected back by the door mirror 7 when the driver changed viewing direction of the door mirror 7 and since the influence caused by the reflection by the door mirror 7 is reduced, the range-finding performance of a short distance can be improved and it is made possible to get rid of false alarms.

Third Embodiment

Figure 4:
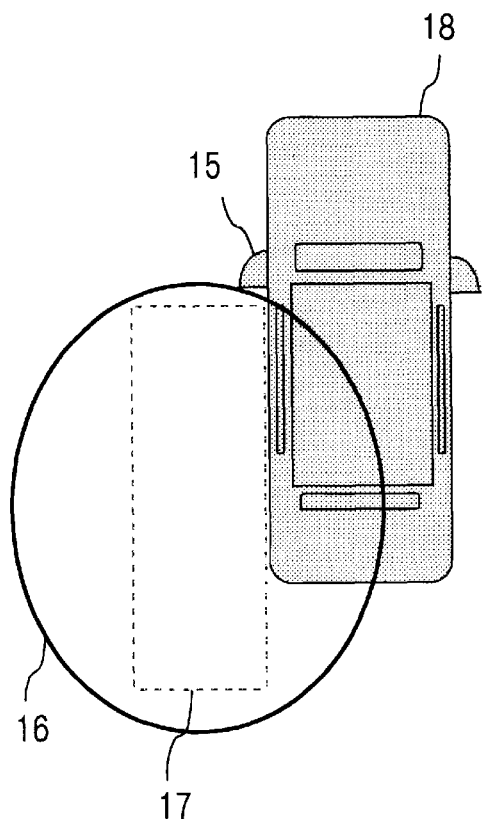
FIG. 4 is a view as seen from the top of the vehicle showing the radiation pattern of the transmitting antenna of the vehicle perimeter monitor of the third embodiment according to the invention.
Figure 5:
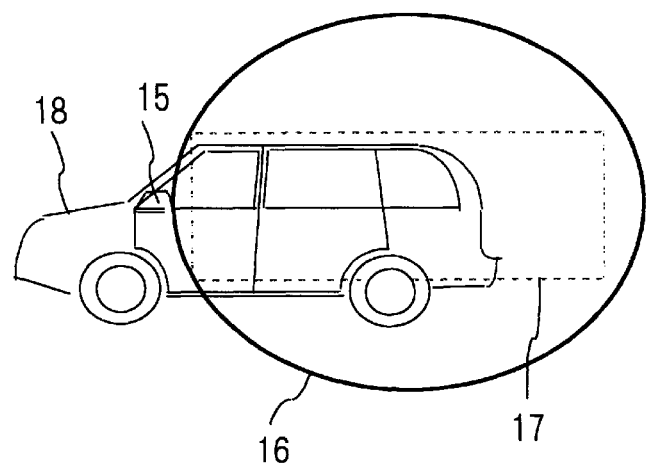
FIG. 5 is a view as seen from the side of the vehicle showing the radiation pattern of the transmitting antenna of the vehicle perimeter monitor of the third embodiment according to the invention.

FIG. 4 and FIG. 5 are the views each as seen from the top or the side of the vehicle showing the condition of the radiation pattern of the transmitting antenna of the vehicle perimeter monitor of the third embodiment according to the invention. In the figure, reference numeral 15 designates a door mirror apparatus. Reference numeral 16 designates a radiation pattern of the transmitting antenna 2. Reference numeral 17 designates an area required for detection. Reference numeral 18 designates a vehicle.

In the present embodiment, based on the aforementioned first and second embodiments, the radiation pattern 16 of the transmitting antenna 2 is shaped to have a wide range to cover the area required even if the driver changes viewing direction the of door mirror 7. As shown in the figure illustrating the radiation pattern 16 shaped by the transmitting antenna 2, beam is spread over a wide range so that the required area can be covered when the driver changed viewing direction of the door mirror 7. Therefore, according to the present embodiment, the direction of the door mirror 7 can be adjusted without deteriorating the range-finding performance.

Fourth Embodiment

Figure 6:
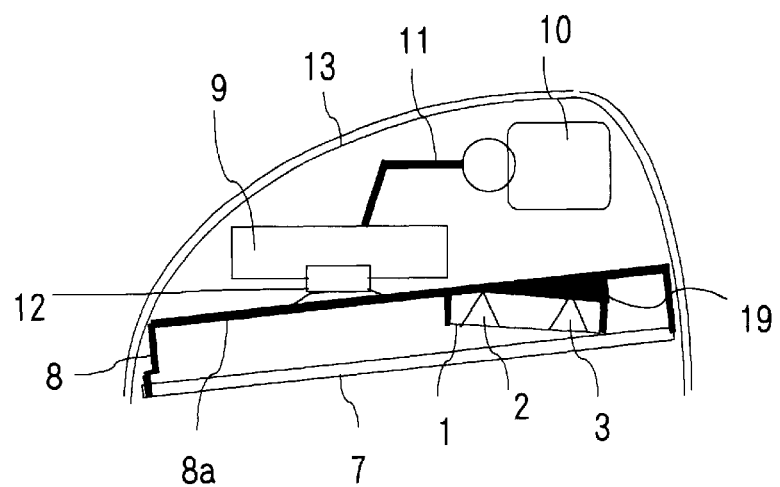
FIG. 6 is a cross-sectional view showing the interior of the left door mirror in which the radar of the vehicle perimeter monitor of the fourth embodiment according to the invention is installed.
Figure 7:
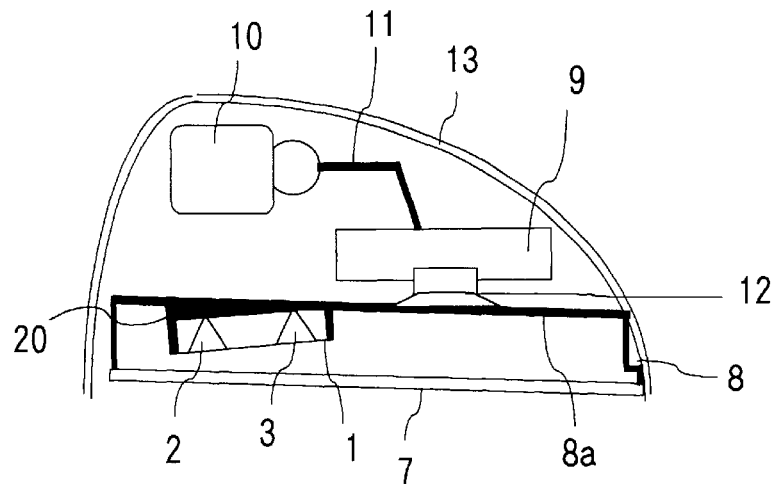
FIG. 7 is a cross-sectional view showing the interior of the right door mirror in which the radar of the vehicle perimeter monitor of the fourth embodiment according to the invention is installed.

FIG. 6 shows the interior of the left door mirror installed in the radar of the vehicle perimeter monitor of the fourth embodiment according to the invention and FIG. 7 shows the interior of the similar right door mirror. In the figure, reference numeral 19 designates a holder member for the left door mirror for attaching the radar 1 including the transmitting antenna 2 and the receiving antenna 3 to the support member 8 of left door mirror apparatus. Reference numeral 20 designates a holder member for the right door mirror for attaching the radar 1 to the support member 8 of right door mirror apparatus. In addition, in the figure, reference numerals designating equal parts or corresponding parts are the same as those in the preceding drawings and so their explanation is omitted.

The present embodiment is based on the vehicle perimeter monitor like the aforementioned first to third embodiments and further the radar 1 including the transmitting antenna 2 and the receiving antenna 3 is attached to the support member 8 of the right and left door mirrors respectively by the holder member for left mirror 19 and the holder member for right mirror 20 which differs in shape to each other. As a result, the deployment of the radar 1 interior of the door mirror apparatus is made possible even in case that the viewing direction of the driver and door mirror 7 differs between left and right the door mirror apparatus.

What is claimed is:

1. A vehicle perimeter monitor carried by a vehicle having a door mirror, the vehicle perimeter monitor comprising:
    a support member supporting the door mirror for movement relative to the vehicle;
    a transmitting antenna fixed on the support member for radiating a transmitted wave generated by a transmitting circuit to the perimeter of the vehicle through the door mirror;
    a receiving antenna fixed on the support member for receiving the transmitted wave reflected from obstacles existing near the perimeter of the vehicle to send a received information signal to a receiving circuit;
    an actuator for moving the support member so as to change a viewing direction of the door mirror while maintaining a fixed positional relationship between the door mirror, the transmitting antenna, and the receiving antenna;
    a processing unit for calculating the distance between the vehicle and the obstacles based on the received information signal and determining a danger degree of collision; and
    an indicator for notifying the result of calculation by the processing unit to a driver of the vehicle.

2. The vehicle perimeter monitor claimed in claim 1, wherein the transmitting antenna is installed at such a distance from the door mirror that the reflection of the transmitted wave by the door mirror becomes smallest.

3. The vehicle perimeter monitor claimed in claim 2, wherein the transmitting antenna has a radiation pattern shaped to cover a predetermined detection area even if a driver changes the viewing direction of the door mirror.

4. The vehicle perimeter monitor claimed in claim 1, wherein the transmitting antenna and the receiving antenna are attached to the support member by a holder member.

5. The vehicle perimeter monitor claimed in claim 4, further comprising:
    a left support member and a right support member provided respectively on left and right sides of the vehicle; and
    a left holder member and a right holder member provided respectively on the left and the right support members;
    wherein the left and the right holder members have different shapes.

6. A door mirror apparatus for a vehicle, the door mirror apparatus comprising:
    a housing fixed on the vehicle;
    a support member provided in the housing and supporting a door mirror for movement relative to the housing;
    a transmitting antenna fixed on the support member for radiating a transmitted wave through the door mirror; and
    a receiving antenna fixed on the support member for receiving the transmitted wave reflected from obstacles existing in the perimeter of the vehicle; and
    an actuator for moving the support member having the transmitting antenna and the receiving antenna fixed thereto, relative to the housing.

7. A door mirror apparatus for a vehicle, the door mirror apparatus comprising:
    a housing;
    a support member provided in the housing and supporting a door mirror for movement relative to the housing;
    a transmitting antenna fixed on the support member for radiating a transmitted wave through the door mirror; and
    a receiving antenna fixed on the support member for receiving the transmitted wave reflected from obstacles existing in the perimeter of the vehicle,
    wherein the transmitting antenna is spaced apart from the door mirror at a distance that minimizes the reflection of the transmitted wave by the door mirror.

8. The vehicle perimeter monitor claimed in claim 7, wherein the transmitting antenna has a radiation pattern shaped to cover a predetermined detection area even if a driver changes a viewing direction of the door mirror.

9. A door mirror apparatus for a vehicle, the door mirror apparatus comprising:
    a housing;
    a support member provided in the housing and supporting a door mirror for movement relative to the housing;

a transmitting antenna fixed on the support member for radiating a transmitted wave through the door mirror; and a receiving antenna fixed on the support member for receiving the transmitted wave reflected from obstacles existing in the perimeter of the vehicle, wherein the transmitting antenna and the receiving antenna are attached to the support member by a holder member and move with the support member and the door mirror.

10. The apparatus claimed in claim 7, wherein the housing is fixed on the vehicle, and further comprising an actuator for moving the support member having the transmitting antenna and the receiving antenna, relative to the housing.

11. The apparatus claimed in claim 9, wherein the housing is fixed on the vehicle, and further comprising an actuator for moving the support member having the transmitting antenna and the receiving antenna, relative to the housing.

* * * * *